United States Patent [19]

Baehr

[11] 4,435,183
[45] Mar. 6, 1984

[54] PROCESS FOR RAPID DEWATERING AND DRYING OF CALCIUM SULFATE HEMIHYDRATE

[75] Inventor: Donald O. Baehr, Arlington Heights, Ill.

[73] Assignee: United States Gypsum Company, Chicago, Ill.

[21] Appl. No.: 349,231

[22] Filed: Feb. 16, 1982

[51] Int. Cl.³ .................. B01D 1/14; C01F 11/46; C04B 11/02
[52] U.S. Cl. .................. 23/293 R; 23/304; 423/555
[58] Field of Search ............. 23/293 R, 304; 423/555; 159/47.1, DIG. 2, DIG. 3, DIG. 25

[56] References Cited

U.S. PATENT DOCUMENTS

| 757,649 | 4/1904 | Brothers . | |
|---|---|---|---|
| 1,570,583 | 1/1926 | Wilson | 23/304 |
| 1,941,188 | 12/1933 | Randel . | |
| 3,377,020 | 4/1968 | Piper | 423/555 |
| 3,561,930 | 2/1971 | Brown et al. | 23/304 |
| 3,829,280 | 8/1974 | Jenne et al. | 423/555 |
| 3,956,456 | 5/1976 | Keller et al. | 423/555 |
| 4,086,099 | 4/1978 | Prudhon et al. | 423/555 |
| 4,234,345 | 11/1980 | Fassle | 423/555 |
| 4,247,518 | 1/1981 | Charlet et al. | 423/555 |

FOREIGN PATENT DOCUMENTS

| 2727544 | 1/1979 | Fed. Rep. of Germany | 423/555 |
|---|---|---|---|
| 2815366 | 10/1979 | Fed. Rep. of Germany . | |

Primary Examiner—Bradley Garris
Attorney, Agent, or Firm—Robert H. Robinson; Kenneth E. Roberts; Samuel Kurlandsky

[57] ABSTRACT

A process for rapidly dewatering and drying calcium sulfate hemihydrate in a centrifuging and flash drying operation by ejecting the wet solids from the centrifuge bowl directly into the flash dryer's high velocity, high volume, heated air stream.

6 Claims, 4 Drawing Figures

PROCESS FOR RAPID DEWATERING AND DRYING OF CALCIUM SULFATE HEMIHYDRATE

BACKGROUND OF THE INVENTION

1. Field of the Invention

This invention relates to a rapid process for mechanically dewatering and thermally drying aqueous slurries of calcium sulfate hemihydrate, and, in particular, alpha hemihydrate slurries.

In the slurry process for the preparation of alpha calcium sulfate hemihydrate, the three major steps are the autoclave calcination of gypsum to the hemihydrate under high pressure and temperature conditions; mechanically dewatering the aqueous hemihydrate slurry; and then thermally drying to produce the desired dried product. Ever since the inception of the slurry process, those skilled in the art have been cautioned to maintain the material from the autoclave through the drier at high temperature in order to avoid rehydration of the calcium sulfate hemihydrate. The temperature of the mass is normally maintained substantially in excess of 140° F. (60° C.) until the mass of calcined gypsum crystals is completely dried, in order to avoid problems caused by adhesiveness and cohesiveness of the hemihydrate. As the slurry is being converted to dried solids the hemihydrate solids become more sticky as additional water is removed.

Any substantial cooling of the hot mass causes the hemihydrate material to stick to the equipment, and deposits of hemihydrate rapidly build up on the equipment. Overlaid material results in further cooling and the material hydrates and forms a hard mass. Processing equipment must then be shut down and cleaned out before there is plugging and possible breakage of handling equipment and conveying lines. Clean surfaces can have deposits build up to the point of plugging in a matter of minutes, and then jack hammers must be used to clean the equipment.

2. Description of the Prior Art

Over the years, centrifugation has been frequently proposed as a means for dewatering the aqueous slurry, as mentioned in U.S. Pat. No. 1,941,188. That patent discloses that the calcined gypsum slurry is dewatered in a filter press, centrifuge or the like, while the temperature of the mass is maintained sufficiently high to prevent rehydration, and then, it is completely dried in a dryer such as a rotary dryer. It is readily apparent, however, that sufficient means to avoid stickiness of the dewatered damp material have not yet been developed for the centrifugation dewatering process. U.S. Pat. No. 3,377,020 discloses a process using a solid bowl, continuous centrifuge for the dewatering and applying heat to the solids discharge compartment at the exit of the centrifuge. In that process, the walls of the solids receiving compartment are lined and heated to a temperature of approximately 246°–251° F. (119°–122° C.) by a fluid or gas circulating in spaces between the inner and outer walls. Such heating is maintained to the drier through a lining in enclosed conveying equipment. U.S. Pat. No. 3,561,930 also discloses heating the casing of a solid bowl centrifuge, but to lower temperatures in this range and optionally assisting the heating by adding saturated steam near the liquid outlet to prevent evaporation and depositing of gypsum scale from the liquid effluent. It is believed that these processes have never been commercially successful.

Published German Federal Republic application No. 28 15 366, published Oct. 18, 1979, also proposes, in a process using a push centrifuge followed by a flow drying unit, that a walled space between an inner housing and an exterior housing of the discharge spout on the end of that centrifuge be heated. Further, it proposes diverting a portion of the hot air from the dryer through that space to heat the inner walls of the discharge spout to avoid sticking of the wet solids. Here also, the inner walls of the transition area from the discharge spout to the dryer appear to be heated by a continuation of the heated space between the inner and outer walls. It is believed this proposed solution has never been commercially practiced.

Thus, it is apparent that other means must be found in order to use successfully centrifugation for dewatering such slurries without the difficulties of deposit build-up and plugging by caked solids.

SUMMARY OF THE INVENTION

Thus, there is a need at the present time to provide improved processes for converting gypsum to the hemihydrate; and particularly, to solve the problem of deposit build up on the mechanical dewatering and the thermal drying equipment. An object and advantage of the present invention is to provide a process for rapid mechanical dewatering and thermal drying of calcium sulfate hemihydrate slurry.

Basically, it has now been found that the hemihydrate slurry may be dewatered and dried rapidly without sticking to the equipment by enclosing the discharge end of the centrifuge bowl in a flash drier's heated air stream and ejecting the solids from the lip of the bowl directly into the high velocity, high volume, heated air stream. The hemihydrate particles are suspended in the air stream until they are thoroughly dry, with at least the outer surface of the particles being dried immediately upon contact with the hot air. As a result, the transferring and transporting equipment between the centrifuge and the thermal drier, including the heated duct wall linings, are eliminated.

DETAILED DESCRIPTION OF THE PREFERRED EMBODIMENTS

In the practice of the present invention, an aqueous slurry of calcium sulfate hemihydrate is rapidly mechanically dewatered and thermally dried by passing the slurry into a centrifuging zone, therein separating a damp solids fraction from a liquid fraction, and, from the lip of the centrifuge bowl, injecting the damp solids fraction directly into the suspending heated dry air stream of a flash dryer to dry immediately at least the surface portion of the damp hemihydrate. The hemihydrate solids are suspended in the heated air stream until the hemihydrate particles are thoroughly dried.

Figure 2:
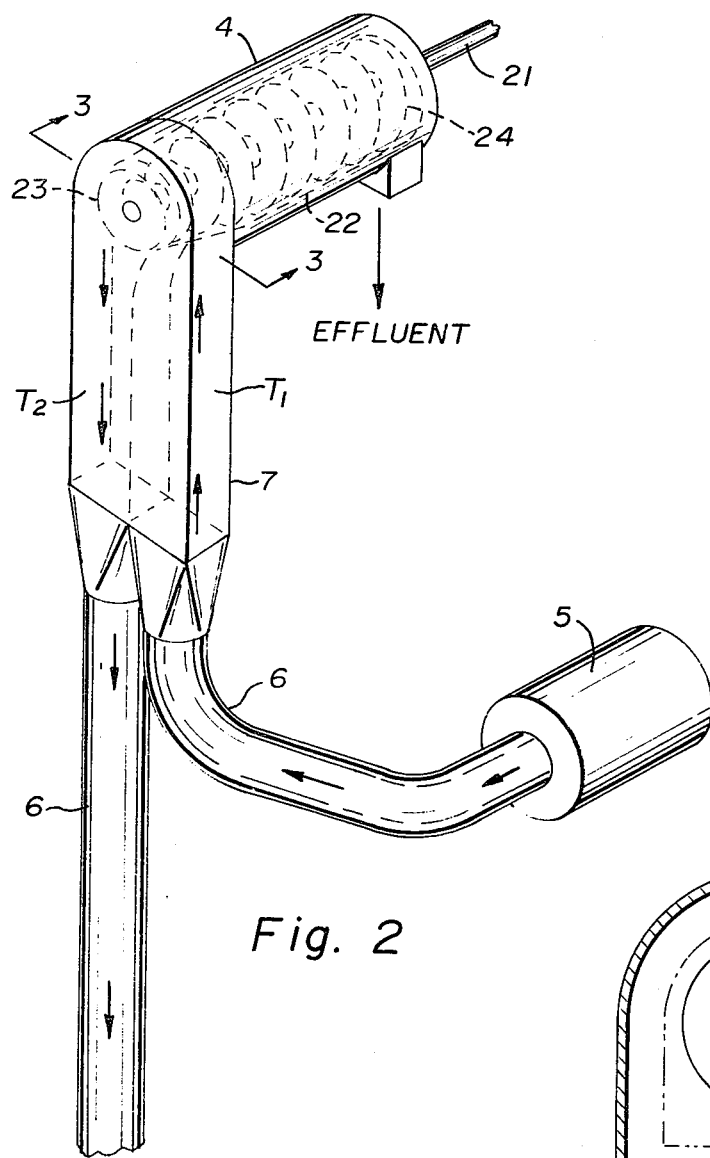
FIG. 2 is a perspective view of portions of the centrifuge and drier of FIG. 1.

The centrifuge may be any batch or continuous filtration centrifuge capable of separating a hemihydrate slurry into a damp solids fraction containing, for example, from about 1 to 20% by weight of free water and an effluent liquid fraction. Preferably, a solid bowl, conveyor centrifuge, as shown in FIG. 2, is used. However, the centrifuge may be any of the pusher, peeler, or basket type filter centrifuges with one or more perforate or imperforate, high speed rotating or stationary filter bowls. In the stationary bowl type, a housing or conveyor is rapidly rotated to provide centrifugal force for separation of damp solids. The filtration centrifuge, regardless of construction and type, is modified in accordance with the present invention to place the damp solids fraction, separated from the liquid effluent, immediately within the high volume, high velocity heated air stream of a flash dryer.

Figure 1:
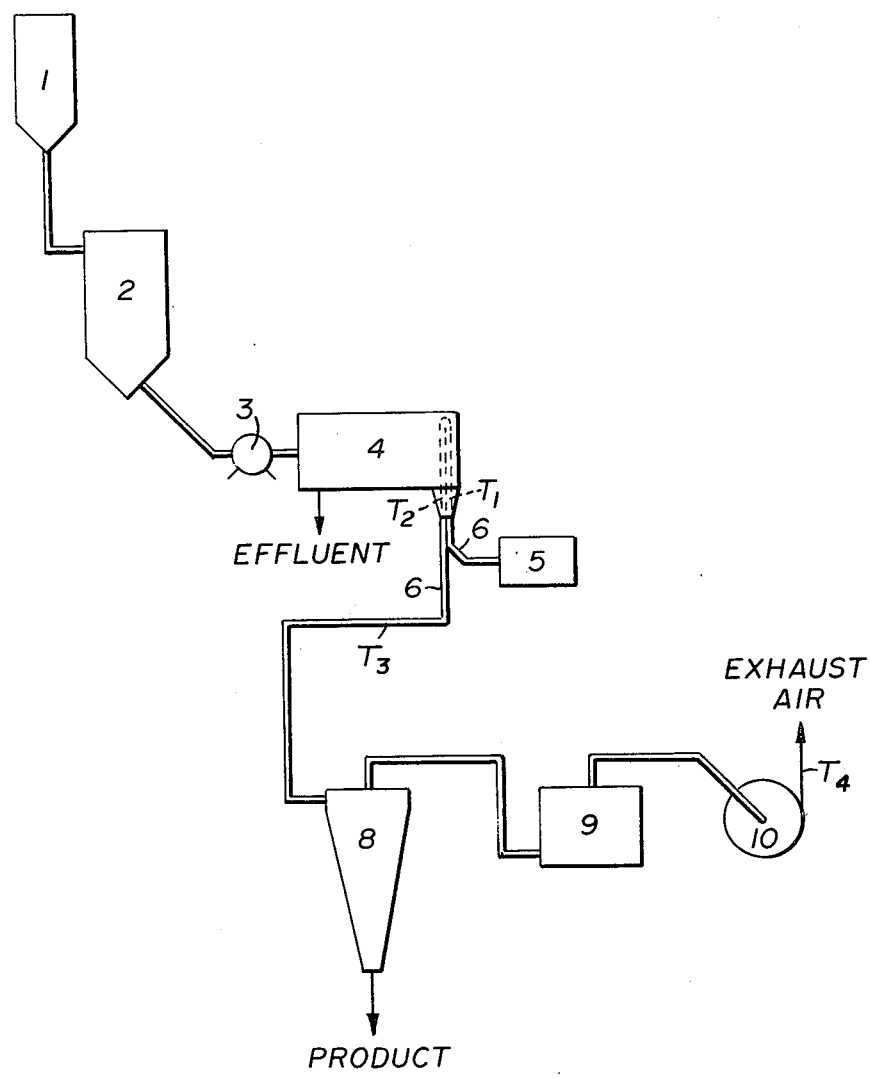
FIG. 1 schematically illustrates one preferred method of practicing the present invention with a continuous solid-bowl centrifuge and Stokes-tube flash dryer.
Figure 4:
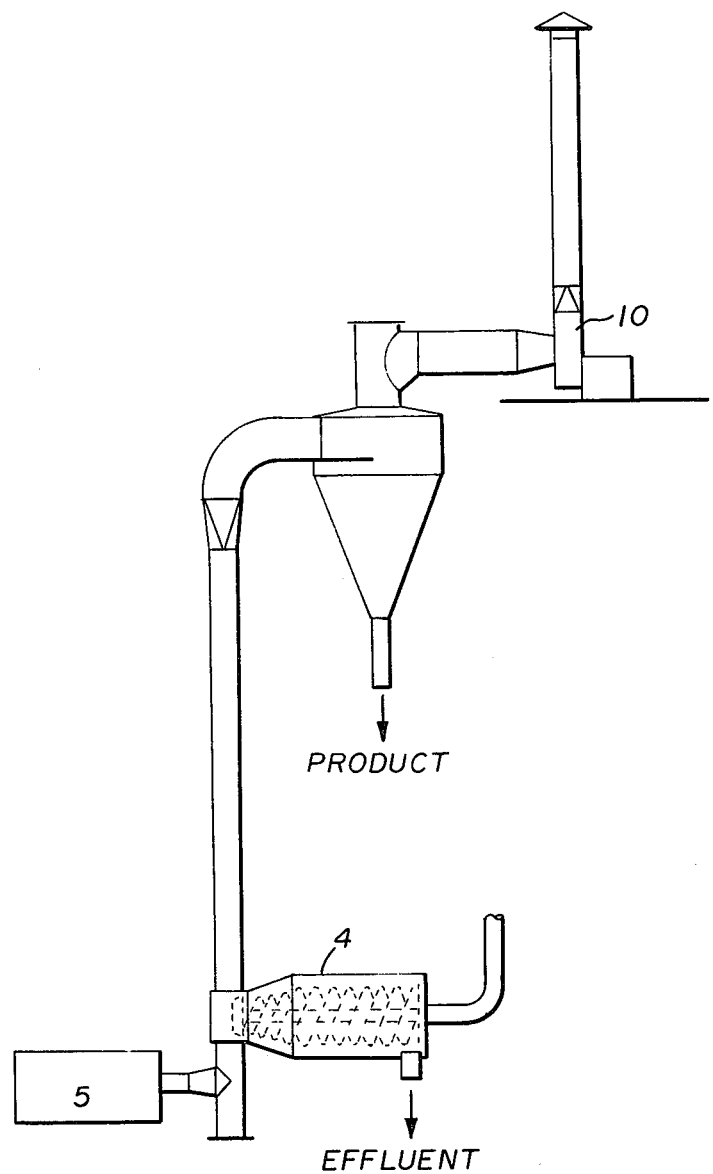
FIG. 4 illustrates another embodiment of a centrifuge flash drier combination of the present invention.

By "flash dryer" is meant any apparatus for the instantaneous thermal removal of moisture from wet solids materials by the application of heat in a high velocity, high volume stream of hot air. Flash drying systems suitable for use in the present invention include Stokes-tube types as shown in FIGS. 1 and 2 providing high velocity, co-current, nonvortexing turbulent air flow, and cyclone types, such as shown in FIG. 4, providing high velocity, vortexing turbulent air flow. The heated air source may be any air heater furnace supplying direct products of combustion or clean heated air through the use of filters, heat exchangers and the like. The heater will provide air having a temperature ranging from about 400°–2,000° F. (205°–1095° C.).

As noted hereinabove, a substantial problem with prior attempts to separate centrifugally hemihydrate from aqueous slurries was the adhesiveness/cohesiveness of the hot deliquored material. As it converts from the damp state to the dry state, it becomes increasingly more cohesive and adhesive; and any material depositing on metal will stick to it, build up further deposits, and convert to the dihydrate. The conversion rate depends upon temperature, percent free water to be evaporated in drying, and the like which are changing as the material moves from a damp solid to a dry solid.

In carrying out the present invention, a minimum amount of about 8 pounds of air per pound of water to be evaporated; a minimum air velocity of about 3,500 feet per minute (1067 meters per minute); and a minimum air temperature of about 400° F. (205° C.) are required to simultaneously suspend the moist solids in the high velocity air stream, evaporate free water in the damp fraction, and provide sufficient air velocity to carry the evaporated water and the drying product through the drying system. Of course, it will usually be necessary to use more air than the minimum required to carry the water away. The air also supplies the heat to evaporate the water, and thus, the actual heat supplied by the dryer heater must be sufficient to heat the air and the product, evaporate the water, and allow for normal losses. This will generally be about 1394 Btu (1321 kJ) per pound of water to be evaporated. Of course, by using a larger amount of air, a lower temperature can be maintained in the system. Once the amount of air is determined e.g., 8 pounds (with dry air at atmospheric pressure and 70° F. being 0.076 lbs. per cubic foot per pound of water to be evaporated out of the damp solids), the cross-section and length of the flash drying unit to provide the necessary velocity and drying time is readily determined.

In the practice of this invention, as more particularly shown in FIGS. 1 and 2, the moist dewatering solids are ejected from the centrifuge bowl lip and immediately suspended in the drying air stream of the flash dryer, in essence, by placing the end of the centrifuge within the flash drying unit. As depicted in FIG. 2 a preferred centrifuging apparatus comprises a rotating bowl (22) in a housing (4), the bowl terminating in an open end commonly referred to as the "lip" (23). A scroll screw conveyor (24) rotating on a shaft moves the aqueous slurry from the material inlet means (21) along the scroll (24). As the hemihydrate slurry becomes subjected to centrifugal force by the rotating bowl (22), it rapidly dewaters, an effluent liquid fraction is separated from the solids and is removed, and the moist solids fraction is urged along the bowl (22) to the lip (23). As the moist solids spin off the lip of the centrifuge bowl, they are injected into and suspend in the hot drying gases flowing around the discharge end of the centrifuge bowl, as seen more clearly in FIG. 3. As the moist hemihydrate solids are flung off the lip of the centrifuge they immediately disperse in the drying air stream and the outer surfaces of the particles immediately dry. At such high temperatures, velocities and volumes of flowing hot gas, the hemihydrate material is immediately dried to a point that eliminates cohesiveness/adhesiveness before the drying material comes into contact with itself or metal surfaces.

EXAMPLE

An alpha hemihydrate calcium sulfate slurry was treated as illustrated in FIG. 1.

The calcium sulfate hemihydrate slurry was formed by calcining gypsum in autoclave (1) and passing it to an atmospheric slurry holding tank (2). The slurry in the holding tank was maintained at about 210° F. (99° C.) and metered via slurry pump (3) to the continuous rotating solid bowl centrifuge (4). The slurry, still at a temperature about 210° F. (99° C.), was dewatered in the centrifuge and the separated water effluent passed to disposal or recycle. Hot driving air at a temperature of about 800° to about 1200° F. (about 427° to about 649° C.) was supplied by dryer heater (5) to flash dryer duct (6) wrapping around the discharge end of centrifuge (4), as more particularly shown in FIG. 2. The velocity of the air in duct (6) was maintained at a minimum of about 3,500 feet per minute and the heater temperature was higher in these runs than would be normal because the duct at the centrifuge discharge as shown in FIG. 2 was operating at the minimum volume of air. Enlarging the duct (6) around centrifuge (4) will allow a higher volume of air and a lower temperature in the range of 600°–800° F. (315°–427° C.) may be used.

Figure 3:
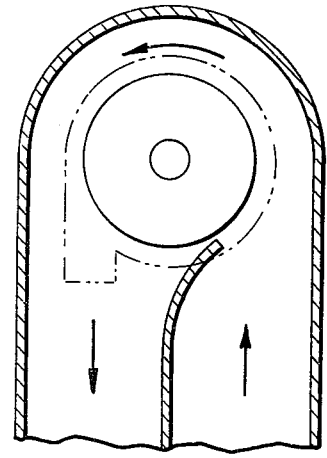
FIG. 3 is a cross-sectional view along line 3—3 of FIG. 2.

Referring to FIG. 2, within the centrifuge housing (4) the dewatering hemihydrate slurry was fed via inlet (21) onto bowl (22) and urged by scroll (24) to the lip (23) of the centrifuge bowl, whereupon the damp solids were flung by centrifugal force from the lip (23) of the spinning bowl (22) into suspension in the high velocity drying air stream in the enlarged flash dryer duct (7). As illustrated in Figure 3, a portion of the enlarged dryer duct (7) may be bent at an angle to divert the heated air in the duct, although this is not necessary for operation of the invention. The solids are immediately suspended in the drying air passing around the centrifuge bowl (22) and carried downstream in the flash dryer duct (6). Referring to FIG. 1, the dry solids were then transported to a cyclone collector (8) for separation of hot moist gases and dusts from the dried product. The separated moist gases and dusts pass through dust collector (9) and dryer exhaust fan (10) or other typical baghouse operations to the atmosphere. The dry solids separated in the cyclone collector (8) thereupon were passed to further processing such as packaging equipment in the case of bagged industrial plaster products or storage bins in the case of bulk plaster products and gypsum board products.

The temperatures at certain points in the process were measured in a number of runs as shown in FIGS. 1 and 2, with temperature adjustments being made during the different runs by adjustments to the dryer heater (5), as follows:

$T_1$, upstream of the centrifuge and 30 feet downstream from heater (5) = 800° to 1100° F. (427°-593° C.)

$T_2$, 5 feet downstream from the centrifuge housing = 360°-380° F. (182°-193° C.)

$T_3$, 35 feet downstream from the centrifuge housing = 260°-280° F. (127°-138° C.)

$T_4$, at vent to atmosphere = 240° to 250° F. (116°-121° C.)

Extended runs were made at various temperatures in the ranges set forth hereinabove without any operational shutdown due to plugging with built up deposited solids in the flash dryer duct. From the very high temperature gradients between $T_1$ and $T_2$, it is evident that the suspended bulk solids that were coming off the lip of the centrifuge, at 8-12% moisture, were substantially dry five feet downstream from the centrifuge.

In a comparative run, the solids discharging from a centrifuge bowl would normally discharge against the inner side of the centrifuge case and then drop out through a narrow, tangential, discharge spout feeding a conveyor to an ordinary dryer. In this test an inner casing was installed as shown in the dotted lines in FIG. 3 fitting closely to the solids discharge area. A set of scrapers were fitted to the solids discharge end of the centrifuge bowl to scrape the interior of the inner casing and centrifugally throw the solids through the discharger spout. Hot air was passed through the area formed between the inner and outer solids discharge casings at temperatures between 420° and 480° F. (about 216°-249° C.). The tangential discharge spout of the inner case became completely plugged within about an hour of attempting to operate at these conditions.

It will be apparent from the above description and drawings that various modifications in the process may be made within the scope of the invention. For example, as shown in FIG. 4 the discharge end of the centrifuge may be within a vertical shaft kiln such as a Stokes-tube coupled with a cyclone flash drying system. Alternatively, one or more cyclones in series may be supplied directly with high velocity, high volume heated air and a centrifuge that operates on end may have its discharge end placed in the vortexing air stream to rapidly dewater the slurry and flash dry the damp solids. Thus the configuration of the flash drying reactor, temperatures, retention times and flow velocities may be highly varied while still providing for the thermal drying in immediate conjunction with mechanical dewatering of an aqueous hemihydrate slurry. The process of the present invention is applicable to dewatering and drying hemihydrate slurries of various solids concentrations and to slurries from both natural gypsum rock and byproduct chemical gypsum feed sources.

What is claimed is:

1. A process for rapid mechanical dewatering and thermal drying of a calcium sulfate hemihydrate slurry in a centrifuging and flash drying operation comprising:
    enclosing the discharge end of a centrifuge bowl within a high velocity, high volume, heated air stream of a flash dryer;
    passing high velocity, high volume heated air through the dryer;
    ejecting damp hemihydrate solids directly from the centrifuge bowl lip into the high velocity, high volume heated air stream of the flash dryer;
    and suspending the hemihydrate solids in the high velocity, high volume heated air stream until dry.

2. The process of claim 1 in which the high velocity, high volume air stream is at a temperature of at least about 400° F.

3. The process of claim 1 in which the air stream is at a temperature of between about 400° and 1200° F.

4. The process of claim 3 in which the air stream is at a temperature of between about 400° and 800° F.

5. The process of claim 1 in which the high volume, heated air is provided at a velocity of at least about 3500 feet per minute.

6. The process of claim 1 in which the high velocity heated air is provided in an amount of at least about 8 pounds of air per pound of water to be evaporated from the damp solids.

* * * * *